O. Cann,
Horse Collar.
No. 113,253.    Patented Apr. 4, 1871.
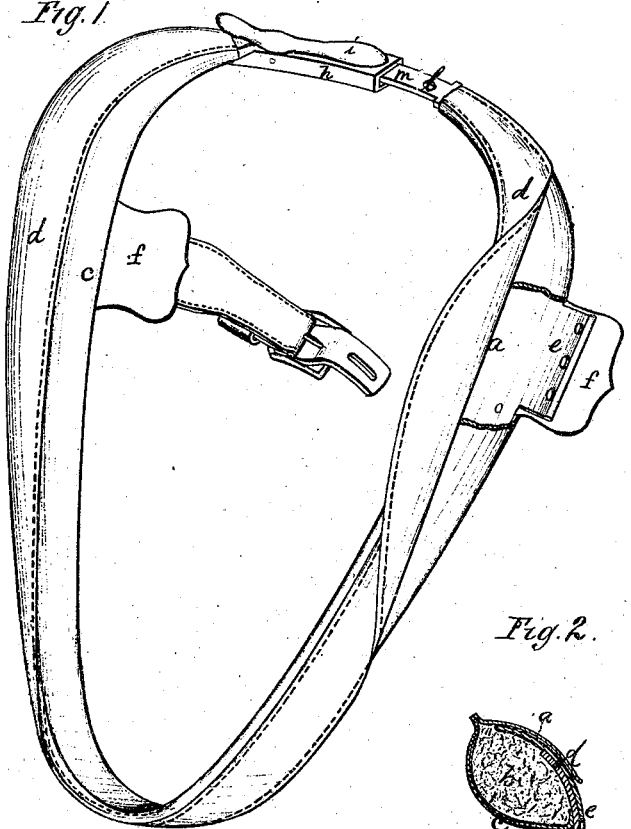
Witnesses.            Otho Cann, Inventor.
                  by    Geo. E. Brown
                        his Attorney.

United States Patent Office.

OTHO CANN, OF COLDWATER, MICHIGAN.

Letters Patent No. 113,253, dated April 4, 1871.

IMPROVEMENT IN HORSE-COLLARS AND HAMES.

The Schedule referred to in these Letters Patent and making part of the same.

I, OTHO CANN, of Coldwater, Branch county, Michigan, have invented certain Improvements in Horse-Collars, of which the following is a specification.

Figure 1 is a perspective view, and
Figure 2 is a transverse section.

This invention consists of an elastic metallic plate, bent into the proper shape to form the foundation of a horse-collar, and provided with projecting plates, formed in one piece with the plate, for the attachment of the tugs.

Referring to the drawing—

$a$ is the elastic steel plate that forms the foundation of the collar therein shown, which plate is curved in cross-section, having its inner side convex and its outer side convex.

$d$ is the stuffing of the collar, applied to the concave side of the plate $a$.

$c$ is the leather covering on the outside of the stuffing and on the inside of the collar.

$d$ is the leather covering on the outside of the plate $a$.

$e$ is a projecting plate, of which there is one on each side, near the base of the collar, said plates having holes near their outer ends for the insertion of the hook by which the tug is attached to the projecting plate.

$f$ is a leather pad, secured to the inside of each plate $e$, and extending outside of the collar, so as to form a guard between the tug-hook and the animal's skin.

In fig. 1 $h$ is the socket, formed at one end of the plate $a$.

$i$ is a spring latch, pivoted to the outside of the socket $h$, and provided with a pin that extends through the side of the socket into its interior.

$l$ is one of a series of holes that are cut in the tongue $m$, formed on the plate $a$ at its other end, which tongue is made small enough to enter when pressed into the socket.

The two ends of the plate $a$ are connected by the passing of the latch-pin through one of the holes $l$, the size of the collar depending upon the distance to which the socket is penetrated by the tongue $m$. By this means the collar is rendered adjustable to horses of different sizes.

When the latch-pin is withdrawn from the end of the plate the elasticity of the latter causes the tongue $m$ to immediately fly out of the socket.

I claim as my invention—

The elastic metallic plate $a$, forming the foundation of a horse-collar, and provided with the projecting lugs $e$, each formed in one piece with the plate, for the attachment of the tugs, and constructed as specified.

OTHO CANN.

Witnesses:
DAVID N. GREEN,
GEORGE J. LANGS.